(12) United States Patent
Pajukoski et al.

(10) Patent No.: US 10,334,613 B2
(45) Date of Patent: *Jun. 25, 2019

(54) SIGNALLING FOR GROUP COMMUNICATIONS

(71) Applicant: NOKIA SOLUTIONS AND NETWORKS OY, Espoo (FI)

(72) Inventors: Kari Pekka Pajukoski, Oulu (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,660

(22) Filed: Dec. 20, 2017

(65) Prior Publication Data

US 2018/0115980 A1 Apr. 26, 2018

Related U.S. Application Data

(62) Division of application No. 14/783,366, filed as application No. PCT/EP2013/061161 on May 30, 2013, now Pat. No. 9,877,333.

(51) Int. Cl.
*H04W 4/00* (2018.01)
*H04W 72/12* (2009.01)
(Continued)

(52) U.S. Cl.
CPC .......... *H04W 72/121* (2013.01); *H04W 4/08* (2013.01); *H04W 72/005* (2013.01);
(Continued)

(58) Field of Classification Search
CPC ..... H04W 72/121; H04W 76/11; H04W 4/08; H04W 72/005; H04W 72/0406; H04W 72/14
See application file for complete search history.

(56) References Cited

U.S. PATENT DOCUMENTS 9,386,425 B2 *  7/2016  Yu ........................... H04W 4/08
9,877,333 B2    1/2018  Pajukoski et al.
(Continued)

FOREIGN PATENT DOCUMENTS

EP      2658338 A1    10/2013
WO   2012097690 A1    7/2012

OTHER PUBLICATIONS

Office Action for European Application 13725707.7, dated Jan. 24, 2018, 4 pages.
(Continued)

*Primary Examiner* — Abdelnabi O Musa
(74) *Attorney, Agent, or Firm* — Brake Hughes Bellermann LLP

(57) ABSTRACT

Apparatus and method for signalling are provided. The solution comprises reserving resources for communication of a set of nodes (114, 116, 118) organized into one or more scheduling groups having a predetermined group identity, each node in a scheduling group having a unique identity. Scheduling messages are transmitted to all nodes, the messages comprising the group identity designating the scheduling group the message is intended, an information element indicating identity of the node allowed to transmit, a bitmap indicating identities of nodes instructed to receive, and information on parameters needed to transmit and receive data utilizing the resources allocated for communication.

8 Claims, 4 Drawing Sheets

(51) Int. Cl.
*H04W 4/08* (2009.01)
*H04W 72/00* (2009.01)
*H04W 72/04* (2009.01)
*H04W 72/14* (2009.01)
*H04W 76/11* (2018.01)

(52) U.S. Cl.
CPC ....... *H04W 72/0406* (2013.01); *H04W 72/14* (2013.01); *H04W 76/11* (2018.02)

(56) References Cited

U.S. PATENT DOCUMENTS

| | | | |
|---|---|---|---|
| 2007/0049309 A1 | 3/2007 | Pan et al. | |
| 2008/0310363 A1* | 12/2008 | McBeath | H04L 5/0023 370/330 |
| 2010/0309860 A1* | 12/2010 | Youn | H04W 72/121 370/329 |
| 2011/0194511 A1* | 8/2011 | Chen | H04W 72/1289 370/329 |
| 2016/0073422 A1 | 3/2016 | Pajukoski et al. | |

OTHER PUBLICATIONS

3GPP TS 36.331 V11.3.0 (Mar. 2013); 3rd Generation Partnership Project; Technical Specification Group Radio Access Network; Evolved Universal Terrestrial Radio Access (E-UTRA); Radio Resource Control (RRC); Protocol specification (Release 11); 344 pages.

Fodor et al., "Design Aspects of Network Assisted Device-to-Device Communications"; IEEE Communications Magazine; May 2011; 8 pages.

Office Action for European Application 13725707.7, dated May 8, 2017; 6 pages.

International Search Report and Written Opinion for International Application No. PCT/EP2013/061161, dated May 26, 2014; 15 pages.

* cited by examiner

SIGNALLING FOR GROUP COMMUNICATIONS

CROSS-REFERENCE TO RELATED APPLICATIONS

This application is a divisional application of U.S. application Ser. No. 14/783,366, filed Oct. 8, 2015, which is a National Stage Application of PCT/EP2013/061161, filed May 30, 2013, the disclosures of which are hereby incorporated by reference herein in their entirety.

BACKGROUND OF THE INVENTION

The exemplary and non-limiting embodiments of the invention relate generally to wireless communication systems. Embodiments of the invention relate especially to apparatuses, methods, and computer program products in communication networks.

In radio communication networks, such as the Long Term Evolution (LTE) or the LTE-Advanced (LTE-A) of the 3rd Generation Partnership Project (3GPP), network planning comprises the use of common base stations (Node B, NB). User equipment (UE) may communicate with another UE via the base station(s), for example. Alternatively, it is proposed that the UEs may communicate directly with each other by applying resources dedicated by the network for a device-to-device (D2D) direct communication. The D2D communication has proven to be network efficient by offloading the traffic processed in the base station(s), for example.

Also other applications for group based communications have been proposed. For example, in co-operative relaying UEs may utilise D2D and relay traffic from other UEs to a base station.

Reserving resources for group based communication is under study. In some proposals, an access point such as a base station may control group based communication by allocating resources for the communication utilising control signalling. The signaling should be fast and have a low overhead.

BRIEF SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor; and at least one memory including computer program code, the at least one memory and the computer program code configured to, with the at least one processor, cause the apparatus at least to: reserve resources for communication of a set of nodes organized into one or more scheduling groups having a predetermined group identity, each node in a scheduling group having an unique identity; transmit scheduling messages to all nodes, the messages comprising the group identity designating the scheduling group the message is intended, an information element indicating identity of the node allowed to transmit, a bitmap indicating identities of nodes instructed to receive, and information on parameters needed to transmit and receive data utilising the resources allocated for communication.

According to an aspect of the present invention, there is provided an apparatus, comprising: at least one processor; and at least one memory including computer program code, the at least one memory and the computer program code configured to, with the at least one processor, cause the apparatus at least to: store information on at least one group identity of a scheduling group the apparatus belongs to and unique identity within each at least one scheduling group, the scheduling group information being utilised in group based communication and information on user equipment identity; scan resource reserved for scheduling messages for a message with stored group identity and stored user equipment identity; if stored user equipment identity is detected initiate transmission or reception according to the message; and if stored group identity is detected scan for unique identity for reception or transmission grant and initiate group based transmission or reception according to the scan result.

According to an aspect of the present invention, there is provided a method, comprising: reserving resources for communication of a set of nodes organized into one or more scheduling groups having a predetermined group identity, each node in a scheduling group having an unique identity; transmitting scheduling messages to all nodes, the messages comprising the group identity designating the scheduling group the message is intended, an information element indicating identity of the node allowed to transmit, a bitmap indicating identities of nodes instructed to receive, and information on parameters needed to transmit and receive data utilising the resources allocated for communication.

According to another aspect of the present invention, there is provided a method in an apparatus, comprising: storing information on at least one group identity of a scheduling group the apparatus belongs to and unique identity within each at least one scheduling group, the scheduling group information being utilised in group based communication and information on user equipment identity; scanning resource reserved for scheduling messages for a message with stored group identity and stored user equipment identity; initiating transmission or reception according to the message if stored user equipment identity is detected; and scanning for unique identity for reception or transmission grant if stored group identity is detected and initiating group based transmission or reception according to the scanning result.

BRIEF DESCRIPTION OF THE DRAWINGS

Embodiments of the present invention are described below, by way of example only, with reference to the accompanying drawings, in which.

DETAILED DESCRIPTION

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any base station, user equipment (UE), server, corresponding component, and/or to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist or are under development. Some examples of different communication systems are the universal mobile telecommunications system (UMTS) radio access network (UTRAN or E-UTRAN), long term evolution (LTE®, known also as E-UTRA), long term evolution advanced (LTE-A®), B4G (Beyond 4G), Wireless Local Area Network (WLAN) based on IEEE 802.11 standard, worldwide interoperability for microwave access (Wi-MAX), Bluetooth®, personal communications services (PCS) and systems using ultra-wideband (UWB) technology. IEEE refers to the Institute of Electrical and Electronics Engineers. LTE and LTE-A are developed by the Third Generation Partnership Project 3GPP.

Figure 1:
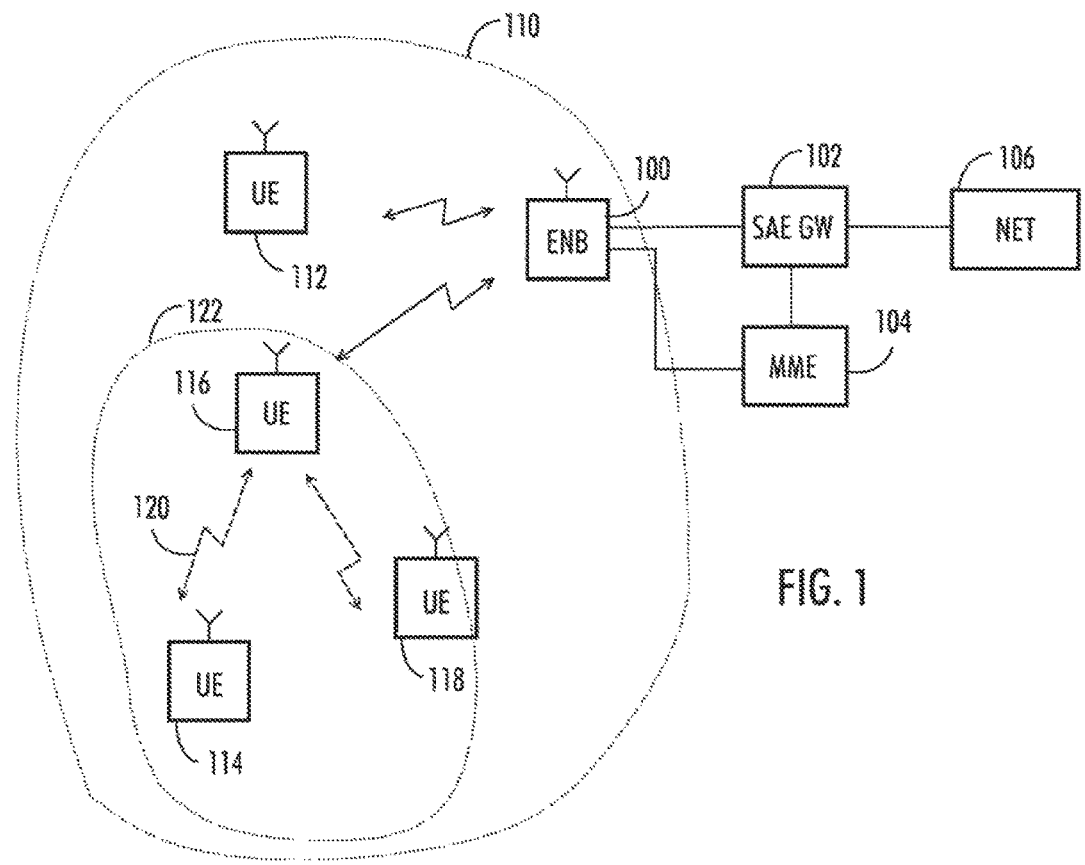
FIG. 1 illustrates an example of a communication environment.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on LTE/SAE (Long Term Evolution/System Architecture Evolution) network elements is shown. However, all the embodiments described in these examples are not limited or applicable to the LTE/SAE radio systems but can also be implemented in other radio systems.

The simplified example of a network of FIG. 1 comprises a SAE Gateway 102 and a Mobility Management Entity MME 104. The SAE Gateway 102 provides a connection to Internet 106. FIG. 1 shows a base station or an eNodeB 100 serving a cell 110. In this example, the eNodeB 100 is connected to the SAE Gateway 102 and the MME 104.

The eNodeBs (Enhanced node Bs) of a communication system may host the functions for Radio Resource Management: Radio Bearer Control, Radio Admission Control, Connection Mobility Control, Dynamic Resource Allocation (scheduling). The MME 104 (Mobility Management Entity) is responsible for the overall UE control in mobility, session/call and state management with assistance of the eNodeBs through which the UEs connect to the network. The SAE GW 102 is an entity configured to act as a gateway between the network and other parts of communication network such as the Internet for example. The SAE GW may be a combination of two gateways, a serving gateway (SGW) and a packet data network gateway (PGW).

The eNodeB 100 may provide radio coverage to a cell 110. The cell 110 may be a macrocell, a microcell, or any other type of cell where radio coverage is present. Further, the cell 110 may be of any size or form, depending on the antenna system utilized. The eNodeB 100 may be used in order to provide radio coverage to the cell 110. The eNodeB 100 may control a cellular radio communication link established between the eNodeB 100 and terminal devices or user equipment 112, 114, 116, 118 located within the cell 110. These communication links marked with solid arrows may be referred as conventional communication links for end-to-end communication, where the source device transmits data to the destination device via the base station 100. Therefore, the user terminals may communicate with each other via the base station 100. The terminal device may be a user equipment of a cellular communication system, e.g. a computer (PC), a laptop, a handheld computer, a mobile phone, or any other user terminal or user equipment capable of communicating with the cellular communication network.

In addition to or instead of the conventional communication links, direct device-to-device (D2D) connections may be established among terminal devices or user equipment. Direct communication links between two devices may be established, e.g., between terminal devices or user equipment 116 and 118 in FIG. 1. A direct communication link 116 marked with a dashed arrow may be based on any radio technology such that the terminal devices or user equipment 106 and 108 involved in the direct communication may apply communication according to any of a plurality of radio access technologies. The eNodeB 100 may be responsible for controlling the direct communication link 120. The radio access technology of the direct communication link 120 may operate on the same frequency band as the conventional communication link and/or outside those frequency bands to provide the arrangement with flexibility. Thus, the eNodeB 100 may be responsible for allocating radio resources to the direct communication link 120 as well as for the conventional communication links.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), device using a wireless modem (alarm or measurement device, etc.), laptop and/or touch screen computer, tablet, game console, notebook, and multimedia device.

The user equipment (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of eNodeBs, the user device may have an access to a plurality of radio cells and the system may comprise also other apparatuses, such as physical layer relay nodes or other network elements, etc. At least one of the NodeBs or eNodeBs may be a Home eNodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The eNodeBs of FIG. 1 may provide any kind of these cells. A cellular radio system may be implemented as a multilayer network including several kinds of cells. Typically, in multilayer networks, one node provides one kind of a cell or cells, and thus a plurality of eNodeBs are required to provide such a network structure.

Recently for fulfilling the need for improving the deployment and performance of communication systems, the concept of "plug-and-play" eNodeBs has been introduced. Typically, a network which is able to use "plug-and-play" eNode Bs, includes, in addition to Home eNodeBs (HeNBs) or Home NodeBs (HNBs), a HeNB Gateway (HeNB GW), or HNB Gateway (HNBGW) (not shown in FIG. 1). A HeNB GW or HNB-GW, which is typically installed within an operator's network, may aggregate traffic from a large number of HNBs back to a core network.

Figure 2:
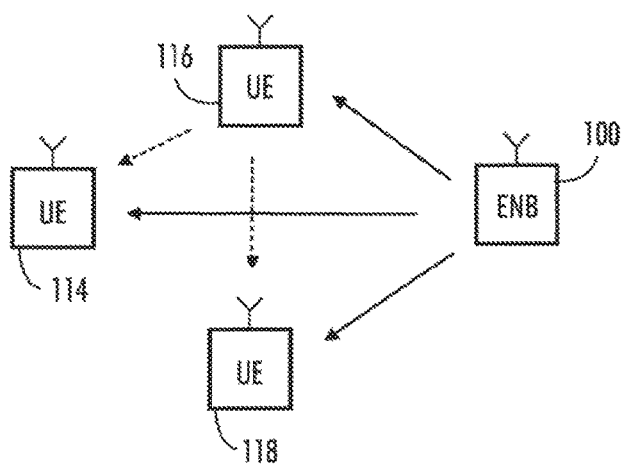
FIG. 2 illustrates an example of device to device communication situation.

Especially future applications require fast and low overhead control signalling for assigning resources for multiple destination nodes or UEs. An example of such a situation is illustrated in FIG. 2. In FIG. 2 there are a number of UEs 114, 116, 118 configured to use D2D communications in certain cell. A base station, access point or eNodeB 100 is configured to control dynamic resource allocation for D2D communications. Any of the UEs can be a transmitting node (UE 116 is the transmitting node in the example of FIG. 2) and any of the UEs can be the receiving node (UEs 114, 118 are receiving nodes in the example of FIG. 2). D2D transmission is illustrated with dashed lines and control signalling indicating scheduling grant with solid lines.

Control signalling of the present systems is optimized for point to point traffic resulting unnecessary high control signalling overhead when applied to group communications. For example in LTE, the resource allocation for the reception and the transmission is handled independently. The downlink DL Assignments are used to indicate e.g. on which resources DL data is transmitted to the UE and how it is encoded. Correspondingly, the uplink UL grant tells which resources and transmission parameters the UE should use when transmitting UL data.

In practise, the number of simultaneously scheduled users is limited. For example, in LTE roughly (at maximum) 10 users per cell/subframe/20 MHz bandwidth can be scheduled simultaneously.

Requirements for signalling for assigning resources for multiple destination nodes or UEs include low signalling overhead, commonality to existing scheduling framework (based on blind decoding/CRC check), scalability and flexibility.

In an embodiment, the target is to provide a way to schedule dynamically multiple nodes to receive and transmit the same information without having a need to transmit multiple signalling grants. In an embodiment, it is proposed to define a specific group grant (with pre-defined group ID) which contains necessary information to transmit and receive the packet. The access point or eNodeB controlling the UEs or nodes may be configured to send the group grant scheduling message using the resources reserved for scheduling messages in the system. The group grants may be sent on a specific control channel search space defined for group of UEs (such as common search space). Alternatively, the search space may be derived based on group ID.

In an embodiment, the nodes or UEs are organized into scheduling groups based on a predetermined criterion. The criterion may be the location of each node, the path loss experienced by each node, service or quality needed by each node. Groups can be overlapping in such that the same node can be present in multiple groups at the same time. In the example of FIG. 1, UEs 116, 118, 120 are in the same scheduling group 122.

In an embodiment, each group has a predetermined group identity (Group_ID) and each node in a scheduling group has a unique identity.

In an embodiment, eNodeB or an access point is configured to divide the UEs into groups based on a predetermined criterion. Likewise, the eNodeB or the access point may be configured to allocate an identity to each of each group.

In an embodiment, the eNodeBs or access points of a given area form a network where one eNodeB or access point is master and other eNodeBs or access points are slaves. In such a configuration the master eNodeB or access point may be responsible to dividing UEs and slave access points into scheduling groups.

In an embodiment, a predefined physical layer UE Identity may be used as a group identity (Group_ID). An example of such is Cell Radio Network Temporal Identifier C-RNTI in LTE. The identity may provide physical layer error protection for target UEs (at the same time for both transmitting and receiving nodes). In error protection, target cell identity may act as predefined bit-sequence in Node B site.

Figure 3:
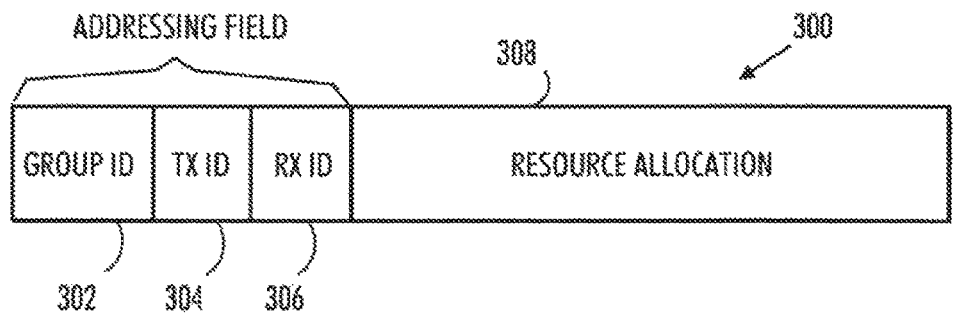
FIG. 3 illustrates an example of a possible scheduling grant message.

FIG. 3 illustrates an example of a possible scheduling grant message. In an embodiment, the message 300 comprises an addressing field 302, 304, 306 and data field 308 comprising resource allocation data. The addressing field comprises the group identity (Group_ID) 302, a bit field TX ID 304 indicating the identity of the node or UE allowed to transmit. The addressing field further comprises a bitmap RX ID 306 defining the target receiving nodes.

In an embodiment, the bit field 304 may be an information element of length 3 or 4 bits. The bitmap 210 length may be up to 16 bits, for example.

In another embodiment, a predefined signalling state of TX ID field 304 is reserved for special usage. An example of such usage is to indicate that the scheduling access point grant reserves a broadcast resource for some or all UEs or in the group. The reserved signalling state could be e.g. "all ones" or "all zeros".

The resource allocation data field 308 may comprise resource allocation in time/frequency, modulation/coding scheme MCS and hybrid automatic repeat request HARQ process id, for example. Some of the Information Elements of resource allocation field 308 may relate only to reception or transmission whereas some other parameters may relate to both In an embodiment, the eNodeB controlling the scheduling may have flexibility to define the size of the scheduling grant according to use case. For example, it may vary the size of the bitmap 306 used to define the target receiving nodes according to size of the groups. The same applies to the size of the bit field indicator 308 of the transmitting node.

In an embodiment, fields 302, 304 and 306 may be used together for error protection in receiver site. If a receiving nodes detects own group ID and TX or RX ID, it is likely that packet is correctly received.

The probability of false positive detection (i.e. the case where the control channel blind detection based CRC check results in detection even if the related scheduling grant has not been transmitted) of the scheduling grant depends on the length of the CRC. It is noted that when using the proposed approach, it's also possible to reduce the cyclic redundancy check (CRC) length while keeping the probability of false transmissions at target level. This is due to the fact that transmitting node indicator increases the effective length of the CRC. In the case CRC length is kept unchanged, introduction of TX ID 304 bits in the scheduling grant will virtually increase the CRC length, which will in turn reduce the probability of false positive detection.

In an embodiment, the UE (or other node) may perform blind detection for C-RNTI (including other dedicated grants as well) and group-grant at the same time. Assuming that group grant is better protected against false positive (due to additional TX ID which acts as virtual CRC) group ID may be prioritized in this case.

In an embodiment, a predefined code word of the information element indicating identity of the node allowed to transmit indicates a broadcast case where the access point is transmitting. Term broadcast is used here as the generic term covering both one-to-many and one-to-one scheduling (and related data transmission) from the access point to one or more receiving nodes.

In an embodiment, the proposed arrangement allows coordinated scheduling also between nodes configured to different scheduling groups. In this scenario, scheduling eNodeB or access point node may assign additional receiving grants corresponding to neighbouring scheduling group(s). The advantage of this approach is that will allow keeping the size of scheduling groups reasonable (especially when taking into account bitmap used to indicate the reception node). The only disadvantage of this approach is that it will increase the scheduling overhead compared to the case when nodes are part of the same scheduling group.

The proposed method minimizes the signalling overhead and enables fast resource assignment for future applications such as network coding, network assisted D2D communication, co-operative relaying and centralized scheduling.

Figure 4:
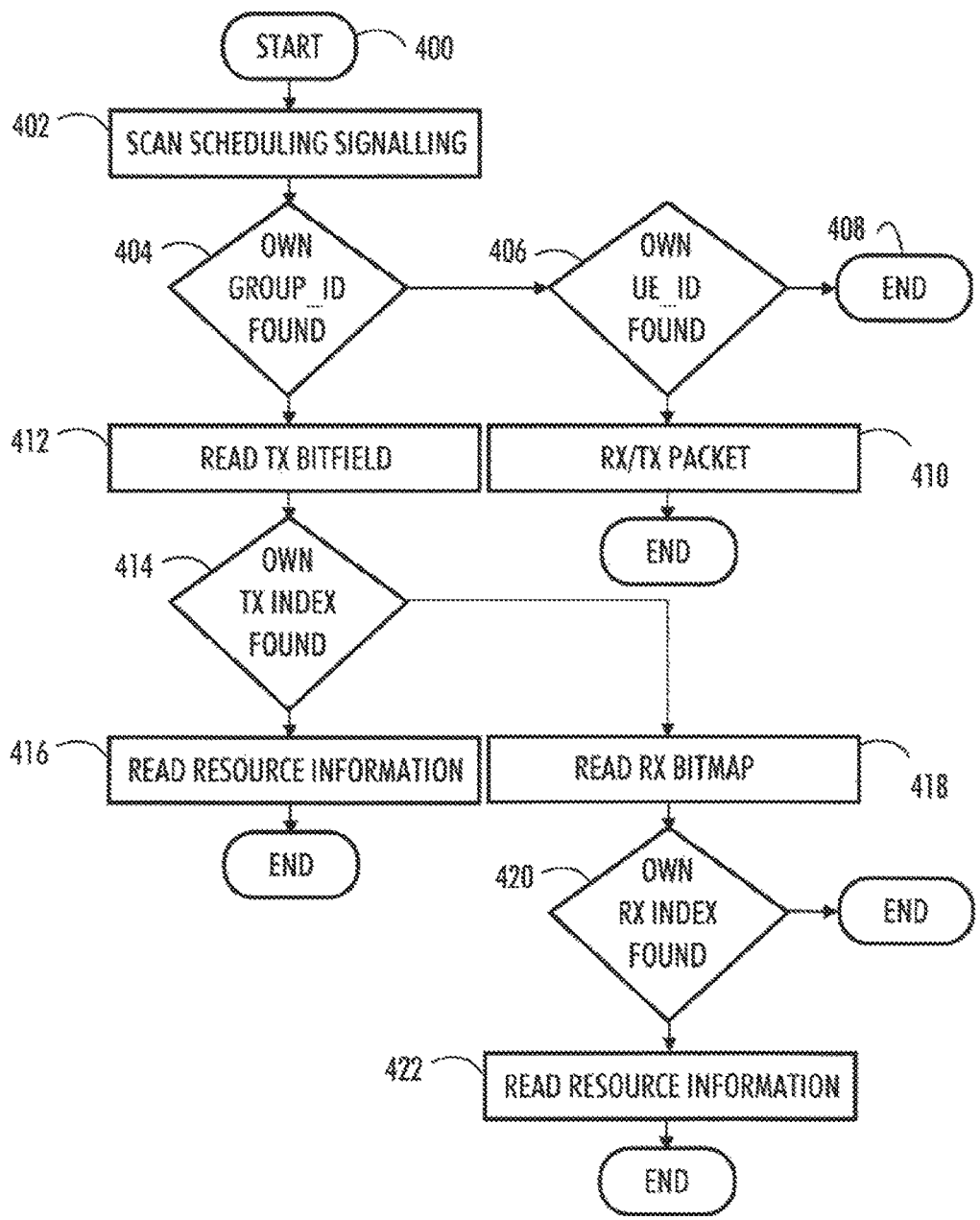
FIG. 4 is a flowchart illustrating an embodiment.

FIG. 4 is a flowchart illustrating an embodiment of the invention. The flowchart illustrates the method from the UE point of view. The embodiment starts at step 400.

In step 402, the UE scans the resources allocated for grant signalling. In an embodiment, the UE does blind decoding on the resources by using its own identifier and group identifier (Group_ID). Any suitable channel such as PDCCH (Physical Downlink Control Channel) or EPDCCH (Enhanced Physical Downlink Control Channel) can be used for conveying scheduling grants.

In step 404, it is checked whether Group_ID was found. If not, it is checked in step 406 whether the own identifier UE_ID (C-RNTI, for example) was found. If not, the process ends in step 408. It UE_ID was found, the UE starts in step 410 a normal procedure to receive or transmit packet using the resources indicated in the message.

If valid Group_ID was found in step 404, the UE is configured to scan in step 412 the bit field 304 indicating the identity of the node or UE allowed to transmit. If UEs own unique identity is found in step 414, the UE reads resource information field 416 so that it can transmit using the allocated resources. Group based communication may be initiated by transmitting data.

If own identity was not present in the bit field 304 in step 412, the UE is configured to scan the bitmap 306 defining the target receiving nodes in step 418. If UEs own unique identity was found in step 420 the process ends.

If own identity was not present in the bitmap 306 in step 418 the UE reads resource information field in step 422 so that it can receive using the allocated resources. Group based communication may be initiated by receiving data.

When comparing the group based communication and the legacy type point-to point communication, there may be a difference between scheduling timing related to receiver operation: The Rx timing may be delayed by n subframes (n>0) in the case reception is triggered by Group_ID, whereas the Rx timing for C-RNTI triggered transmission may follow timing n=0.

Figure 5A:
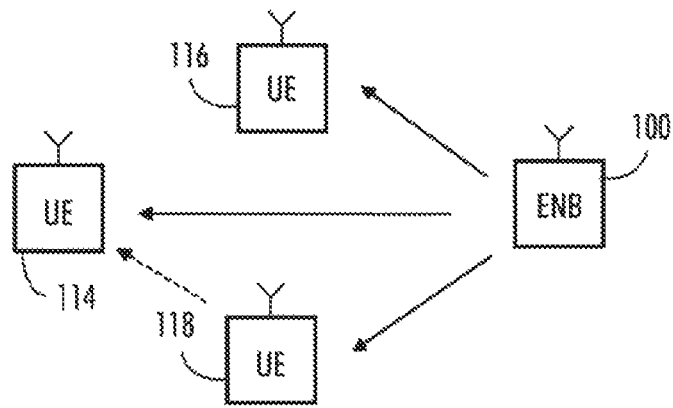
FIGS. 5A and 5B illustrate examples of device to device communication situation.
Figure 5B:
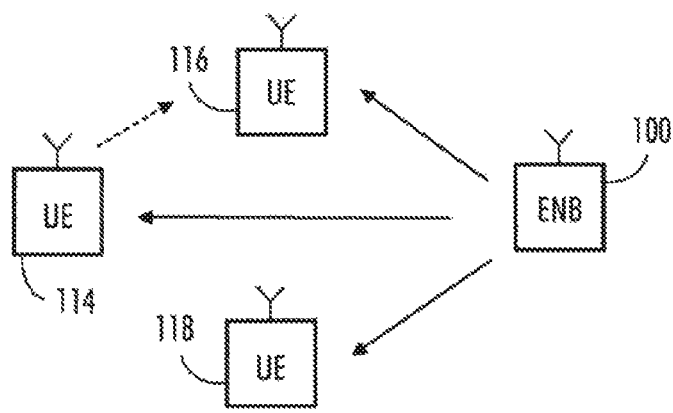

In an embodiment, the proposed scheduling method can be used for multi-hop relaying. FIGS. 5A and 5B illustrate this embodiment. The figure illustrates an access point or eNodeB 100 and three UEs 114, 116, 118. In FIG. 5A, UE 118 is to be the transmitting UE by transmitting a signal to UE 114. This is the first hop. In FIG. 5B, UE 114 is to be the transmitting UE by transmitting a signal to UE 116. This is the second hop. Basically, there is one scheduling grant message per hop. The scheduling eNodeB or access point 100 changes the transmitting node indicator according to the hop (UE 118 for the first hop, UE 114 for the second hop). The scheduling messages are indicated in the figures with solid lines and data signals as dashed lines.

Considering the situation in FIG. 5A, the scheduling eNodeB or access point 100 may provide the reception opportunity (target receiving nodes) not only for the next receiving node in the multi-hop route (UE 114 in given example) but also for other receiving nodes in the route (i.e. UE 116 in the example). This enables to get data through multiple hops via "less-than planned" number of hops, assuming that the conditions are favourable during the transmission instant.

Figure 6:
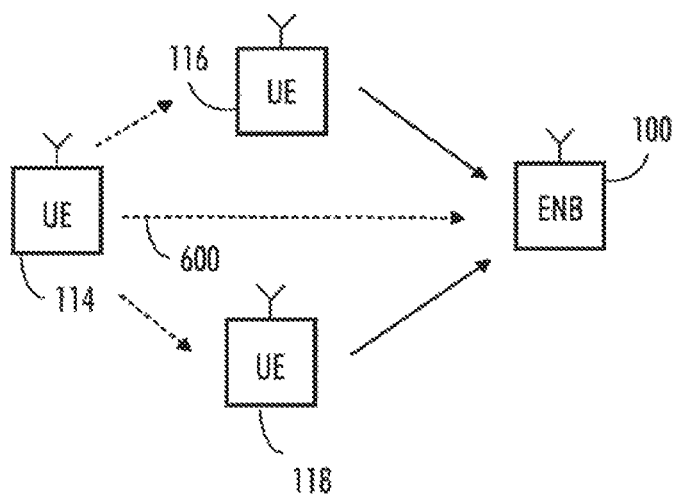
FIG. 6 illustrates an example of co-operative relaying.

FIG. 6 illustrates an example. The figure illustrates co-operative relaying which is one of the use cases of the proposed solution. Let's assume that UE 114 has bad channel conditions via direct link 600 to eNodeB 100. The eNodeB 100 is aware of this and assigns UE 116 and UE 118 to relay the data of UE 114 to the eNodeB. The eNodeB 100 may utilize the proposed resource allocation grant to schedule both transmission and reception of the packet using a single resource allocation grant message.

Figure 7:
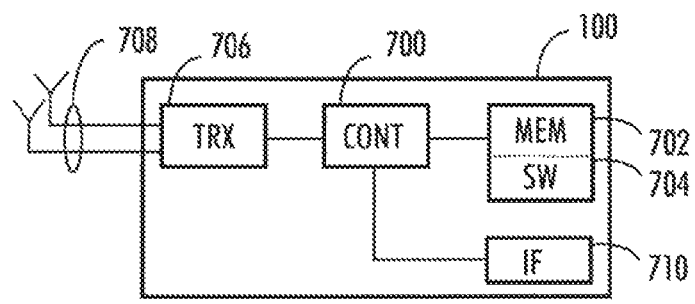
FIG. 7 illustrates an example of an apparatus applying embodiments of the invention.

FIG. 7 illustrates an embodiment. The figure illustrates a simplified example of an apparatus in which embodiments of the invention may be applied. In some embodiments, the device may be a base station or eNodeB or a part of an eNodeB communicating with a set of UEs.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 700 configured to control at least part of the operation of the apparatus.

The apparatus may comprise a memory 702 for storing data. Furthermore the memory may store software 704 executable by the control circuitry 600. The memory may be integrated in the control circuitry.

The apparatus comprises a transceiver 706. The transceiver is operationally connected to the control circuitry 700. It may be connected to an antenna arrangement 708 comprising one more antenna elements or antennas.

The software 704 may comprise a computer program comprising program code means adapted to cause the control circuitry 700 of the apparatus to control a transceiver 706.

The apparatus may further comprise an interface 710 operationally connected to the control circuitry 700. The interface may connect the apparatus to other respective apparatuses such as eNodeB via X2 interface or to the core network.

The control circuitry 700 is configured to execute one or more applications. The applications may be stored in the memory 702. The applications may cause the apparatus to reserve resources for communication of a set of nodes organized into one or more scheduling groups having a predetermined group identity, each node in a scheduling group having an unique identity and transmit scheduling messages to all nodes, the messages comprising the group identity designating the scheduling group the message is intended, an information element indicating identity of the node allowed to transmit, a bitmap indicating identities of nodes instructed to receive, and information on the resources allocated for communication, for example.

Figure 8:
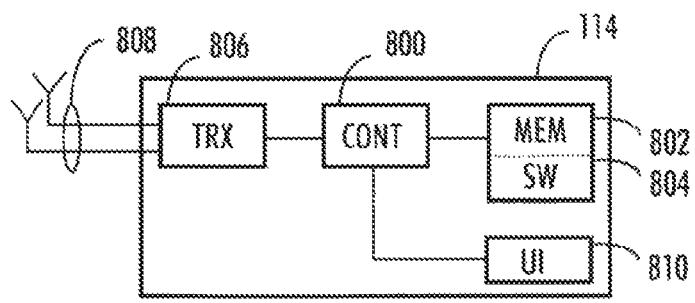
FIG. 8 illustrates another example of an apparatus applying embodiments of the invention.

FIG. 8 illustrates an embodiment. The figure illustrates a simplified example of an apparatus in which embodiments of the invention may be applied. In some embodiments, the apparatus may be user equipment or a part of user equipment communicating with an eNodeB and capable of device-to-device communication.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 800 configured to control at least part of the operation of the apparatus.

The apparatus may comprise a memory 802 for storing data. Furthermore the memory may store software 804 executable by the control circuitry 600. The memory may be integrated in the control circuitry.

The apparatus comprises a transceiver 806. The transceiver is operationally connected to the control circuitry 800. It may be connected to an antenna arrangement 808 comprising one more antenna elements or antennas.

The software 804 may comprise a computer program comprising program code means adapted to cause the control circuitry 800 of the apparatus to control a transceiver 806.

The apparatus may further comprise user interface 810 operationally connected to the control circuitry 800. The interface may comprise a (touch sensitive) display, a keypad, a microphone, and a speaker, for example.

The control circuitry 800 is configured to execute one or more applications. The applications may be stored in the memory 802. The applications may cause the apparatus to store information on at least one group identity of a scheduling group the apparatus belongs to and unique identity within each at least one scheduling group, the scheduling group information being utilised in group based communication and information on user equipment identity; scan resource reserved for scheduling messages for a message with stored group identity and stored user equipment identity; if stored user equipment identity is detected initiate transmission or reception according to the message; and if stored group identity is detected scan for unique identity for reception or transmission grant and initiate group based transmission or reception according to the scan result, for example.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of micro-instructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

What is claimed is:

1. An apparatus, comprising:
   at least one processor; and
   at least one memory including computer program code,
   the at least one memory and the computer program code configured to, with the at least one processor, cause the apparatus at least to:
      store, by a node that is part of a scheduling group within a wireless network, a group identity that identifies the scheduling group that the node belongs to, and information identifying the node within the scheduling group;
      receive, by the node, a scheduling message for at least the scheduling group, the scheduling message providing a single resource allocation grant for both device-to-device (D2D) transmission and reception of data between nodes of the scheduling group, the scheduling message comprising the group identity that identifies the scheduling group for which the scheduling message is intended, an information element identifying a node within the scheduling group that is allowed to transmit data via D2D communication to other nodes in the group using the allocated resources, and a bitmap identifying nodes within the scheduling group that are instructed to receive the data via D2D communication using the allocated resources;
      determine that the scheduling message includes the group identity; and
      determine that the scheduling message further includes one of: 1) information identifying that the node within the scheduling group is allowed to transmit data via D2D communication to other nodes in the group using the allocated resources, and 2) the bitmap includes the information identifying the node to indicate that the node is instructed to receive the data via D2D communication using the allocated resources.

2. The apparatus of claim 1, configured to:
   detect in the scheduling message the information identifying that the node is allowed to transmit using the allocated resources;
   detect in the scheduling message information on parameters needed to transmit the data using the allocated resources; and transmit, by the node, data to other nodes within the group via D2D communication using the allocated resources.

3. The apparatus of claim 1, configured to:
   detect that the bitmap within the scheduling message includes the information identifying the node to indicate that the node is instructed to receive the data via D2D communication using the allocated resources;
   detect in the scheduling message information on parameters needed to receive the data using the allocated resources; and
   receive, by the node, data via D2D communication using the allocated resources.

4. The apparatus of claim 1, configured to:
   receive, by the node from a communication network, information on the scheduling group the node belongs to.

5. A method, performed by an apparatus, the method comprising:
   storing, by a node that is part of a scheduling group within a wireless network, a group identity that identifies the scheduling group that the node belongs to, and information identifying the node within the scheduling group;
   receiving, by the node, a scheduling message for at least the scheduling group, the scheduling message providing a single resource allocation grant for both device-to-device (D2D) transmission and reception of data between nodes of the scheduling group, the scheduling message comprising the group identity that identifies the scheduling group for which the scheduling message is intended, an information element identifying a node within the scheduling group that is allowed to transmit data via D2D communication to other nodes in the group using the allocated resources, and a bitmap identifying nodes within the scheduling group that are instructed to receive the data via D2D communication using the allocated resources;
   determining that the scheduling message includes the group identity; and determining that the scheduling message further includes one of: 1) information identifying that the node within the scheduling group is allowed to transmit data via D2D communication to other nodes in the group using the allocated resources, and 2) the bitmap includes the information identifying the node to indicate that the node is instructed to receive the data via D2D communication using the allocated resources.

6. The method of claim 5, comprising:
   detecting in the scheduling message the information identifying that the node is allowed to transmit using the allocated resources;
   detecting in the scheduling message information on parameters needed to transmit the data using the allocated resources; and
   transmitting, by the node, data to other nodes within the group via D2D communication using the allocated resources.

7. The method of claim 5, comprising:
   detecting that the bitmap within the scheduling message includes the information identifying the node to indicate that the node is instructed to receive the data via D2D communication using the allocated resources;
   detecting in the scheduling message information on parameters needed to receive the data using the allocated resources; and receiving, by the node, data via D2D communication using the allocated resources.

8. A non-transitory computer-readable storage medium comprising instructions stored that, when executed by at least one processor, are configured to cause at least one computing system to at least:
  store, by a node that is part of a scheduling group within a wireless network, a group identity that identifies the scheduling group that the node belongs to, and information identifying the node within the scheduling group;
  receive, by the node, a scheduling message for at least the scheduling group, the scheduling message providing a single resource allocation grant for both device-to-device (D2D) transmission and reception of data between nodes of the scheduling group, the scheduling message comprising the group identity that identifies the scheduling group for which the scheduling message is intended, an information element identifying a node within the scheduling group that is allowed to transmit data via D2D communication to other nodes in the group using the allocated resources, and a bitmap identifying nodes within the scheduling group that are instructed to receive the data via D2D communication using the allocated resources;
  determine that the scheduling message includes the group identity; and
  determine that the scheduling message further includes one of: 1) information identifying that the node within the scheduling group is allowed to transmit data via D2D communication to other nodes in the group using the allocated resources, and 2) the bitmap includes the information identifying the node to indicate that the node is instructed to receive the data via D2D communication using the allocated resources.

* * * * *